United States Patent
Hong et al.

(10) Patent No.: US 8,339,705 B2
(45) Date of Patent: Dec. 25, 2012

(54) OPTICAL SHEET FOR THREE-DIMENSIONAL IMAGE AND THREE-DIMENSIONAL IMAGE DISPLAY DEVICE USING THE SAME

(75) Inventors: Hyung Ki Hong, Seoul (KR); Byung Joo Lee, Gwacheon-si (KR)

(73) Assignee: LG Display Co., Ltd., Seoul (KR)

( * ) Notice: Subject to any disclaimer, the term of this patent is extended or adjusted under 35 U.S.C. 154(b) by 1016 days.

(21) Appl. No.: 11/966,667

(22) Filed: Dec. 28, 2007

(65) Prior Publication Data

US 2008/0218433 A1 Sep. 11, 2008

(30) Foreign Application Priority Data

Mar. 7, 2007 (KR) .................. 10-2007-0022492

(51) Int. Cl.
*G02B 27/22* (2006.01)
(52) U.S. Cl. ........................ 359/463; 348/59
(58) Field of Classification Search .............. 359/463; 348/59
See application file for complete search history.

(56) References Cited

U.S. PATENT DOCUMENTS

| 7,099,080 B2 * | 8/2006 | Lipton et al. ............... 359/463 |
| 2005/0128224 A1 * | 6/2005 | Baek et al. .................. 345/690 |
| 2005/0259323 A1 * | 11/2005 | Fukushima et al. ......... 359/462 |
| 2007/0201133 A1 * | 8/2007 | Cossairt ..................... 359/463 |

FOREIGN PATENT DOCUMENTS

| CN | 1637823 A | 7/2005 |
| CN | 1655012 A | 8/2005 |

* cited by examiner

*Primary Examiner* — Lee Fineman
(74) *Attorney, Agent, or Firm* — Birch, Stewart, Kolasch & Birch, LLP

(57) ABSTRACT

An optical sheet for three-dimensional images and a three-dimensional image display device using the same, are discussed. According to an embodiment, the three-dimensional image display device includes a display unit to display two-dimensional images using unit pixels each including at least three colors of sub-pixels, and an optical sheet to convert the two-dimensional images into a plurality of different three-dimensional images, and the neighboring three-dimensional images are overlapped with each other by a predetermined range. With the above described configuration, the curved lenses are tilted to provide neighboring viewers with three-dimensional images overlapped with each other by 15% to 60%. As a result, a ratio of the horizontal and vertical display resolutions of the three-dimensional images can be equal to a ratio of the horizontal and vertical display resolutions of the two-dimensional images, and the quality of three-dimensional images can be improved.

9 Claims, 7 Drawing Sheets

OPTICAL SHEET FOR THREE-DIMENSIONAL IMAGE AND THREE-DIMENSIONAL IMAGE DISPLAY DEVICE USING THE SAME

This application claims the priority benefit of the Korean Patent Application No. 10-2007-0022492, filed on Mar. 7, 2007, which is hereby incorporated by reference as if fully set forth herein.

BACKGROUND OF THE INVENTION

1. Field of the Invention

The present invention relates to a three-dimensional image display device, and more particularly, to an optical sheet for three-dimensional images, and a three-dimensional image display device using the same, in which a ratio of the horizontal and vertical display resolutions of a three-dimensional image is equal to a ratio of the horizontal and vertical display resolutions of a two-dimensional image, and the image quality of the three-dimensional image can be improved.

2. Discussion of the Related Art

Generally, a three-dimensional image display device is designed to represent three-dimensional images based on the human binocular disparity. The three-dimensional image display device may be classified, for example, into a type using three-dimensional special spectacles, a holographic type, and a stereoscopic type not using the three-dimensional special spectacles.

Recently, a three-dimensional image display device using a curved-lens sheet has been developed.

Specifically, the three-dimensional image display device includes a two-dimensional display panel formed therein with a plurality of pixels, and the curved-lens sheet includes stripe-shaped curved lenses arranged along rows of the pixels so as to be superimposed on the pixels.

The curved-lens sheet serves to divide an image displayed on the two-dimensional display panel into a left-eye image and a right-eye image so as to allow a viewer to recognize a three-dimensional image.

However, in the process of dividing the image displayed on the display panel into the left-eye image and the right-eye images the conventional three-dimensional image display device has a problem in that a ratio of the horizontal and vertical display resolutions of the resulting three-dimensional image differs from a ratio of the horizontal and vertical display resolutions of the two-dimensional image.

Further, since the curved lenses are arranged along rows of the pixels formed on the two-dimensional display panel, the conventional three-dimensional image display device causes a so-called image flipping when view points of a viewer are shifted, and suffers from a degradation in the image quality of the resulting three-dimensional image.

SUMMARY OF THE INVENTION

Accordingly, the present invention is directed to an optical sheet for three-dimensional images and a three-dimensional image display device using the same that substantially obviate one or more problems due to limitations and disadvantages of the related art.

An object of the present invention is to provide an optical sheet for three-dimensional images, and a three-dimensional image display device using the same, in which a ratio of the horizontal and vertical display resolutions of a three-dimensional image is equal to a ratio of the horizontal and vertical display resolutions of a two-dimensional image, and the image quality of the three-dimensional image can be improved.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a three-dimensional image display device according to an embodiment comprises: a display unit to display two-dimensional images using unit pixels each including at least three colors of sub-pixels; and an optical sheet to convert the two-dimensional images into a plurality of different three-dimensional images, wherein the neighboring three-dimensional images are overlapped with each other by a predetermined range.

The neighboring three-dimensional images may be overlapped with each other by the predetermined range at a lateral viewing angle except for a front viewing angle, and the neighboring three-dimensional images are overlapped with each other by 15% to 60% at the lateral viewing angle.

The optical sheet may include a plurality of curved lenses arranged parallel to each other on a base sheet.

Each curved lens may be tilted from a vertical direction of the sub-pixels by a gradient determined based on the base and height of a triangle corresponding to an intersection where the curved lens is superimposed on the number M of horizontally arranged sub-pixels (where, M is a natural number) and the number n of vertically arranged sub-pixels (where, n is a natural number equal to or more than M). The gradient of the curved lens may be set to a value of $\tan^{-1}\{(M \times a \text{ horizontal pitch of the sub pixels})/(N \times a \text{ vertical pitch of the sub pixels})\}$.

The numbers M and N may be set according to the number of views provided by the curved lens.

In accordance with another aspect of the present invention, there is provided a three-dimensional image display device comprising: a display unit to display two-dimensional images using unit pixels each including at least three colors of sub-pixels; and an optical sheet to convert the two-dimensional images into a plurality of different three-dimensional images by use of a plurality of curved lenses arranged parallel to one another, wherein the plurality of curved lenses are tilted from a vertical direction of the sub-pixels by a gradient of $\text{Tan}-1\{(M \times Hp)/(N \times Vp)\}$ (where, M is a natural number and represents the number of horizontally arranged sub-pixels, Hp represents a horizontal pitch of the sub-pixels, N is a natural number equal to or more than M and represents the number of vertically arranged sub-pixels, and Vp represents a vertical pitch of the sub-pixels).

In accordance with yet another aspect of the present invention, there is provided an optical sheet for three-dimensional images comprising: a base sheet; and a lens array including a plurality of curved lenses arranged parallel to one another on the base sheet, wherein the optical density bands emitted from the neighboring curved lenses are overlapped with each other by a predetermined range.

The optical density bands emitted from the neighboring curved lenses may be overlapped with each other by the predetermined range at a lateral viewing angle except for a front viewing angle.

The optical density bands emitted from the neighboring curved lenses may be overlapped with each other by 15% to 60% at the lateral viewing angle.

Each of the plurality of curved lenses may have a stripe form having a semispherical cross section.

A longitudinal axis of each curved lens may be tilted from a vertical direction of the base sheet by a gradient of 18.44 degrees or more.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
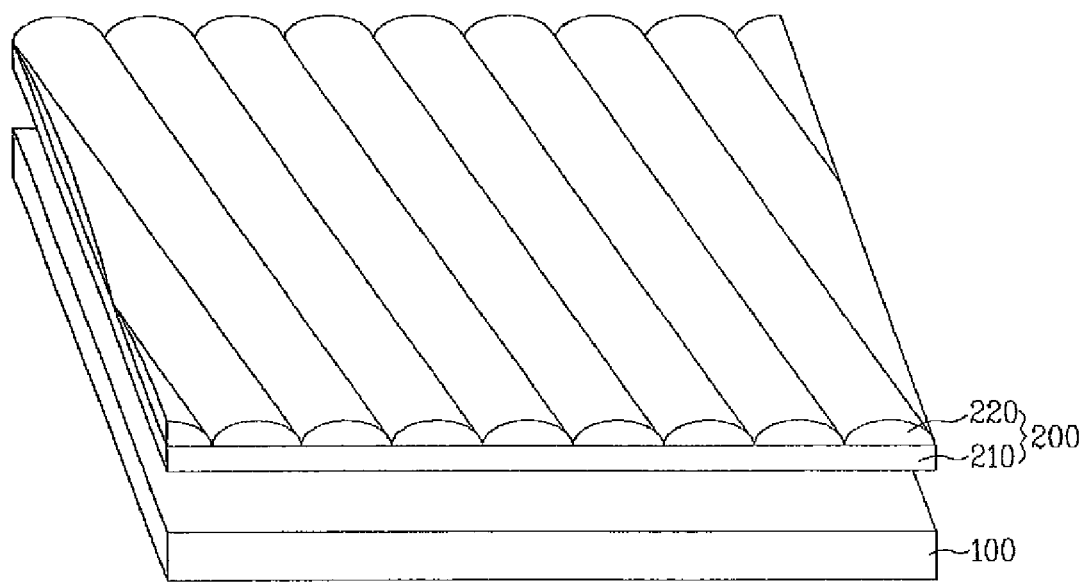
FIG. 1 is a perspective view schematically illustrating an optical sheet for three-dimensional images and a three-dimensional image display device using the same according to an embodiment of the present invention.

FIG. 1 is a perspective view schematically illustrating an optical sheet for three-dimensional images and a three-dimensional image display device using the same according to an embodiment of the present invention.

Referring to FIG. 1, the three-dimensional image display device according to an embodiment of the present invention includes a display unit 100 on which two-dimensional images are displayed, and an optical sheet 200 to provide a plurality of viewers observing the display unit 100 with different three-dimensional images. The optical sheet 200 has a feature in that it provides the neighboring viewers with three-dimensional images overlapped with each other by 15% to 60%.

The display unit 100 displays the two-dimensional images using unit pixels each including sub-pixels R, G, and B of three different colors from one another.

The display unit 100 may be a flat-panel display or cathode-ray tube. Here, examples of the flat-panel display include a liquid crystal display, which displays two-dimensional images as unit pixels are adjusted in the transmissivity of light emitted from a back light unit, a plasma display, which displays two-dimensional images using light having passed through unit pixels based on plasma display, and a light emitting display, which displays two-dimensional images using light having passed through unit pixels under operation of light emitting diodes.

Figure 2:
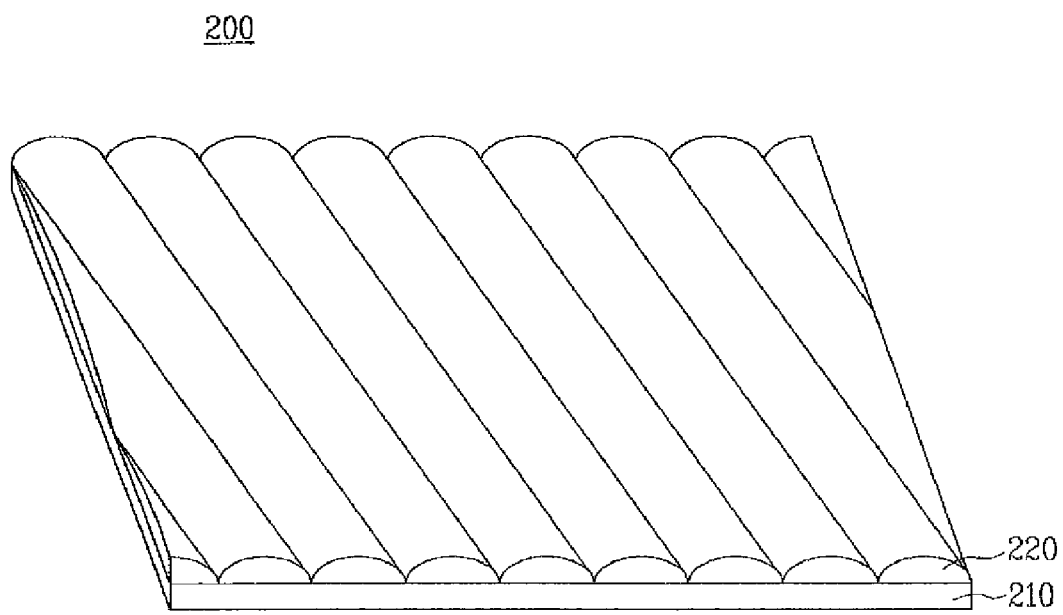
FIG. 2 is a perspective view of the optical sheet shown in FIG. 1.
Figure 3:
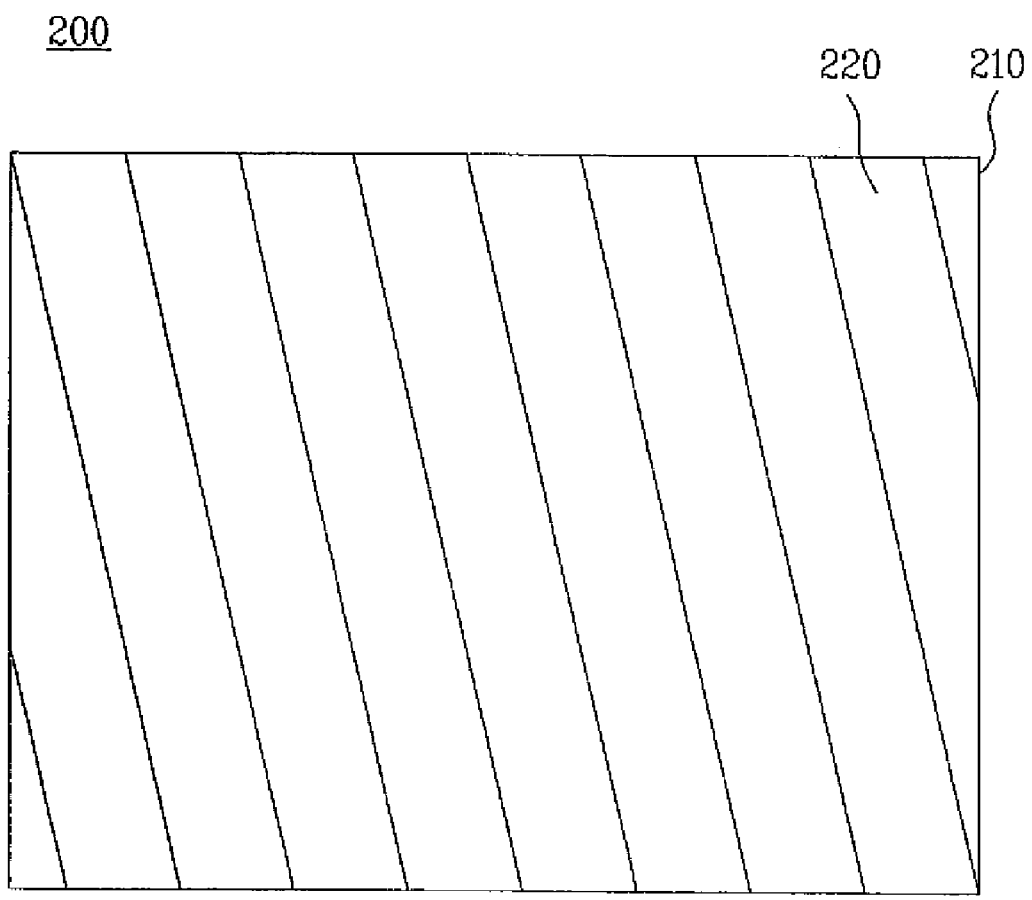
FIG. 3 is a plan view of the optical sheet shown in FIG. 1.

The optical sheet 200, as shown in FIGS. 2 and 3, includes a base sheet 210, and a lens array of a plurality of curved lenses 220 (or a lenticular lenses) arranged on the base sheet 210 parallel to one another with a predetermined gradient.

Each of the plurality of curved lenses 220 has a stripe form having a semispherical cross section. A longitudinal axis of the curved lens 220 is tilted from a vertical direction of the base sheet 210 by a gradient of 18.44 degrees or more (preferably, by a gradient of 18.44~71.56 degrees). With this configuration, the optical density bands from the neighboring curved lenses 220 are overlapped with each other by 15% to 60%.

Figure 4:
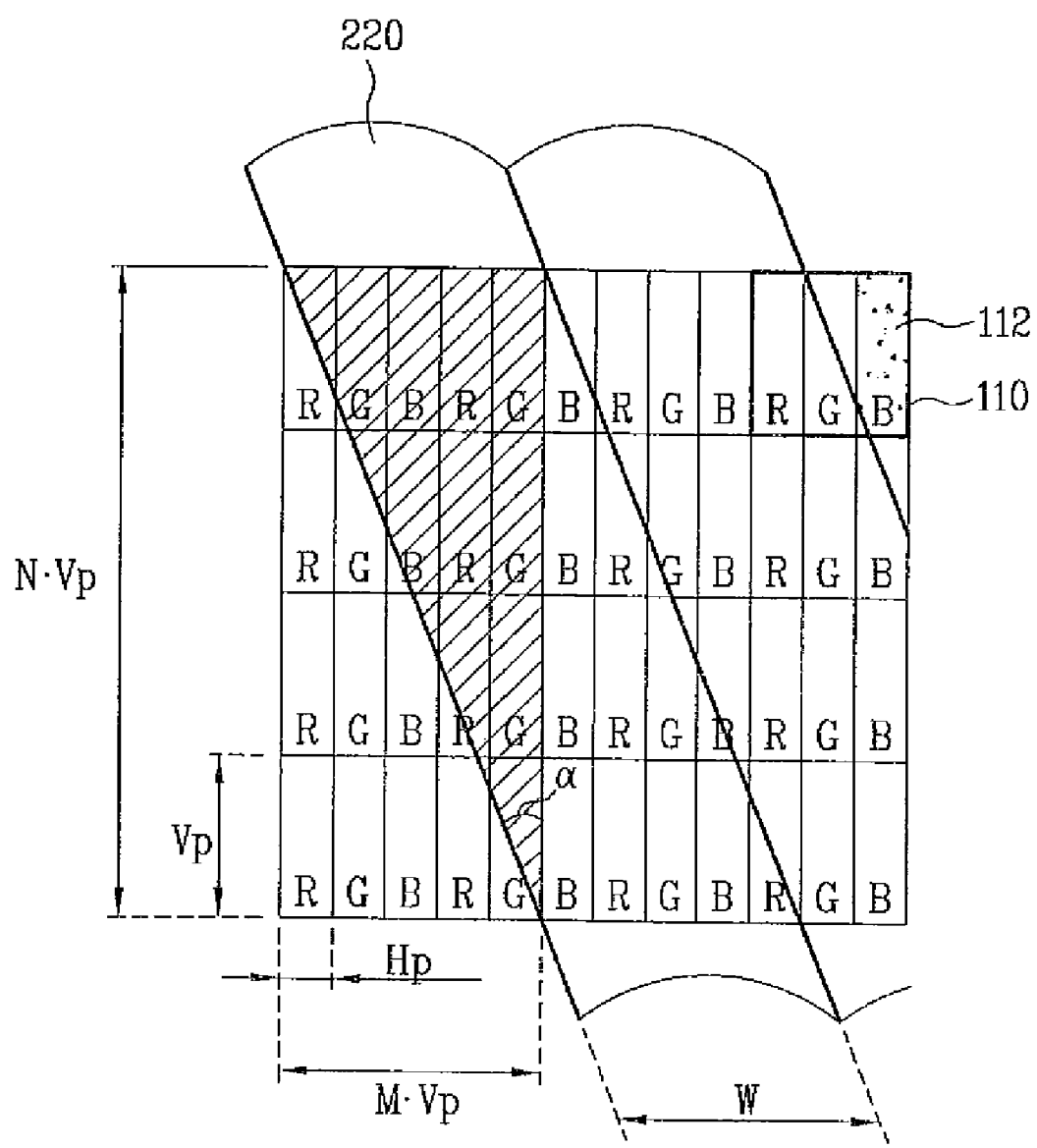
FIG. 4 is a view illustrating the arrangement of sub-pixels and curved lenses shown in FIG. 1.

Each of the curved lenses 220, as shown in FIG. 4, may have a gradient α as represented by the following Equation 1, on the basis of the base and height of a triangle (see. an oblique-lined area) corresponding to an intersection where the curved lens 220 is accurately superimposed on sub-pixels 112 in the display unit 100.

$$\alpha = \tan^{-1}\left(\frac{M \times Hp}{N \times Vp}\right), M \geq N, \frac{M}{N} \geq 1 \qquad \text{Equation 1}$$

In the above Equation 1, M represents the number of sub-pixels arranged in a horizontal direction of the triangle defined by each curved lens 200 and the sub-pixels 112 therebelow, and Hp represents a horizontal pitch of the sub-pixels 112. Also, in the Equation 1, N represents the number of sub-pixels arranged in a vertical direction of the triangle defined by each curved lens 220 and the sub-pixels 112 therebelow, and Vp represents a vertical pitch of the sub-pixels 112. Here, each sub-pixel 112 has a rectangular form having a longer vertical length than a horizontal length, and three sub-pixels constitute a unit pixel 110 having a square form.

A width W of each curved lens 220 is set such that the display resolution of a three-dimensional image is equal to the resolution of the display unit 100 and also, is set based on the number of viewers. Here, the number of viewers may be selected from among values of 9, 12, 15, 20, 25, 36, 72, etc. For example, if the number of viewers is set to a value of 9, the width W of each curved lens 220 may be set such that the curved lens 220 is superimposed on five sub-pixels, as shown in FIG. 5.

In the above described three-dimensional image display device according to the embodiment of the present invention, the display unit 100 includes a display plane in which the red, green, and blue sub-pixels R, G, and B are arranged in a matrix form, and the optical sheet 200 includes the plurality of curved lenses 220 having a gradient α as represented by the above described Equation 1. The optical sheet 200 is disposed on the display unit 100 such that each curved lens 220 is superimposed on the corresponding sub pixels. With this configuration, the three-dimensional image display device according to the present invention can provide a plurality of different three-dimensional images corresponding to two-dimensional images displayed on the display unit 100 on the basis of different positions of viewers.

Figure 5:
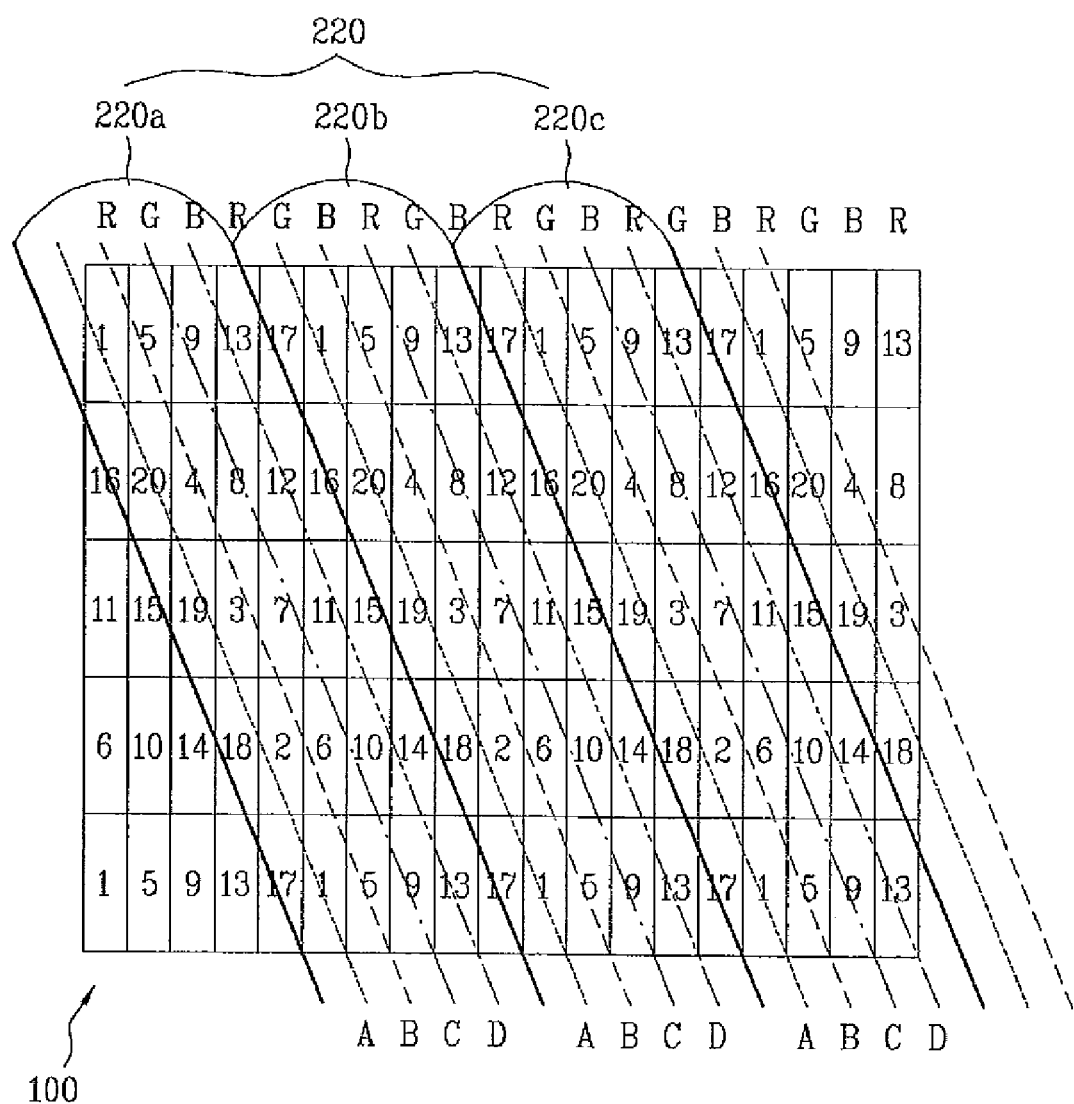
FIG. 5 is a view illustrating the arrangement of pixels based on the number of views for the three-dimensional image display device according to the embodiment of the present invention.

FIG. 5 is a view illustrating the arrangement of pixels based on the number of views for the three-dimensional image display device according to the embodiment of the present invention.

Firstly, the respective sub-pixels of the display unit 100 are given by any one of image numbers from No. 1 to No. 20. Then, the sub-pixels, to which the image numbers from No. 1 to No. 20 are given, are arranged in a matrix configuration of 5×4, that is, the five sub-pixels are arranged along a horizontal direction, and the four sub-pixels are arranged along a vertical direction.

The width W of each curved lens 220 corresponds to the horizontally neighboring five sub-pixels. On the basis of the above described arrangement, each curved lens 220 has an inscribed triangle having the base corresponding to a horizontal pitch of the five sub-pixels and the height corresponding to a vertical pitch of the four sub-pixels. Accordingly, the gradient α of the curved lens 220 is set as the following Equation 2.

$$\alpha = \tan^{-1}\left(\frac{5 \times Hp}{4 \times Vp}\right) \qquad \text{Equation 2}$$

With the above described configuration, the three-dimensional image display device according to the present embodiment provides a viewer with different twenty three-dimensional images as view points A, B, C, and D of the viewer are shifted horizontally. In this case, the viewer will recognize images, from the red, green, and blue sub-pixels R, G, and B to which the same image number is given, as a three-dimensional image through the neighboring three curved lenses 220*a*, 220*b*, and 220*c*. For example, under the assumption that the sub-pixels R, C, and B, to which the same image number No. 1 is given, provide red, green, and blue first images, the viewer can recognize the first images as a three-dimensional image through each of the neighboring three curved lenses 220*a*, 220*b*, and 220*c*.

Figure 6:
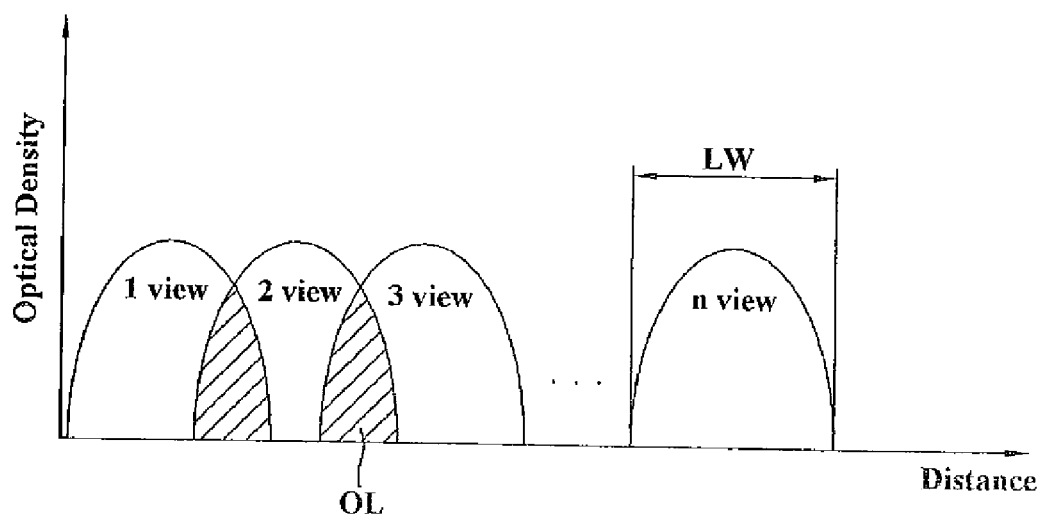
FIG. 6 is a view illustrating the optical density depending on the number of views and a distance between a viewer and the three-dimensional image display device according the embodiment of the present invention.

In the three-dimensional image display device according to the embodiment of the present invention, also, as shown in FIG. 6, the width LW of optical density bands about the respective view points A, B, C, and D are overlapped with each other, thereby providing the neighboring viewers with three-dimensional images overlapped with each other by 15% to 60%. Accordingly, when observing the respective curved lenses 220 by a lateral viewing angle except for a front viewing angle, the neighboring viewers recognize three-dimensional images overlapped with the neighboring three-dimensional images by 15% to 60%.

In conclusion, the three-dimensional image display device according to the embodiment of the present invention provides the neighboring viewers with the overlapped three-dimensional images, thereby achieving smoothly succeeded three-dimensional images without an image flipping even when view points of the viewers are shifted horizontally.

Also, with the three-dimensional image display device according to the embodiment of the present invention, the gradient α of the curved lens 220 is set based on the above described Equation 1, so that the display resolution of the resulting three-dimensional image is equal to the display resolution of the display unit 100.

Figure 7:
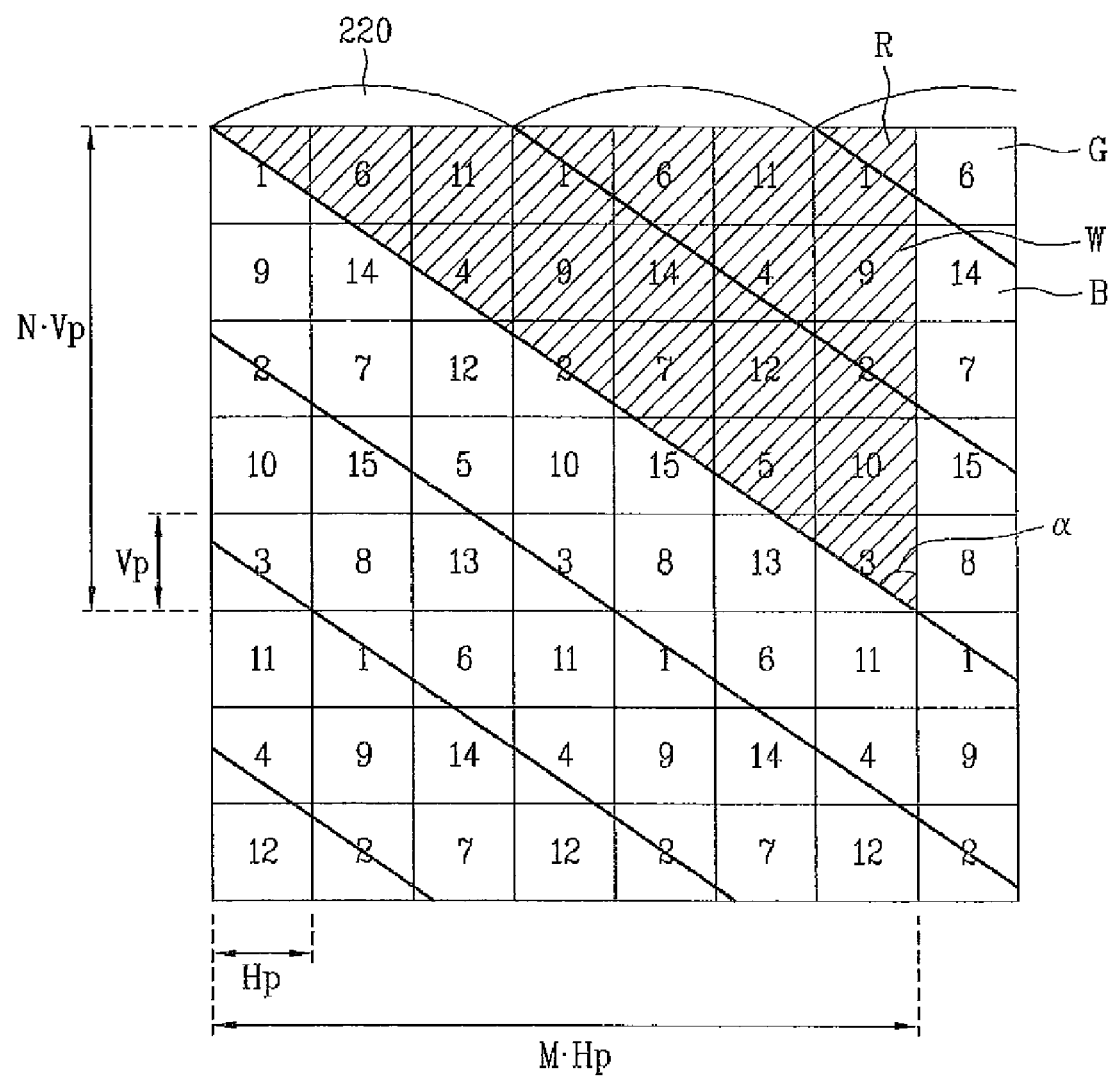
FIG. 7 is a view illustrating the arrangement of pixels based on the number of views for the three-dimensional image display device according to another embodiment of the present invention.

FIG. 7 is a view illustrating the arrangement of pixels based on the number of views for the three-dimensional image display device according to another embodiment of the present invention.

Firstly, the respective sub-pixels of the display unit 100 are given by any one of image numbers from No. 1 to No. 15. In the present embodiment, each sub-pixel has a square form having the same horizontal and vertical pitches as each other, and also, each unit pixel consists of red, green, blue, and white sub-pixels R, G, B, and W arranged in a Quad type, and has a square shape.

Then, the sub-pixels, to which the image numbers from No. 1 to No. 15 are given, are arranged in a matrix configuration of 3×5, that is, the three sub-pixels are arranged along a horizontal direction, and the five sub-pixels are arranged along a vertical direction.

The width of each curved lens 220 corresponds to the horizontally neighboring three sub-pixels. On the basis of the above described arrangement, each curved lens 220 has an inscribed triangle (see. oblique-lined area) having the base corresponding to a horizontal pitch of the seven sub-pixels and the height corresponding to a vertical pitch of the five sub-pixels. Accordingly, the gradient α of the curved lens 220 is set as the following Equation 3.

$$\alpha = \tan^{-1}\left(\frac{7 \times Hp}{5 \times Vp}\right) \qquad \text{Equation 3}$$

With the above described configuration, the three-dimensional image display device according to the present embodiment provides a viewer with different fifteen three-dimensional images as the viewer moves horizontally. In this case, the viewer will recognize images, from the red, green, blue, and white sub-pixels R, G, B, and W to which the same image number is given, as a three-dimensional image through the neighboring three curved lenses 220*a*, 220*b*, and 220*c*.

In the three-dimensional image display device according to the embodiment of the present invention, also, as shown in FIG. 6, the width of optical density bands about the respective view points provided by the curved lenses 220 are overlapped with each other, thereby providing the neighboring viewers with three-dimensional images overlapped with each other by 15% to 60%. Accordingly, when observing the respective curved lenses 220 by a lateral viewing angle except for a front viewing angle, the neighboring viewers recognize three-dimensional images overlapped with the neighboring three-dimensional images by 15% to 60%.

In conclusion, the three-dimensional image display device according to the embodiment of the present invention provides the neighboring viewers with the overlapped three-dimensional images, thereby achieving smoothly succeeded three-dimensional images without an image flipping even when view points of the viewers are shifted horizontally.

As apparent from the above description, according to an optical sheet for three-dimensional images and a three-dimensional image display device, a curved-lens sheet disposed on a display unit is tilted to provide neighboring viewers with three-dimensional images overlapped with each other by 15% to 60%. As a result, the present invention has the effects of equalizing a ratio of the horizontal and vertical display resolutions of a three-dimensional image with a ratio of the horizontal and vertical display resolutions of a two-dimensional image, and improving the quality of three-dimensional images.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A three-dimensional image display device comprising:
   a display unit to display two-dimensional images using unit pixels each including at least three colors of sub-pixels; and an optical sheet to convert the two-dimensional images into a plurality of different three-dimensional images, wherein the neighboring three-dimensional images are overlapped with each other by a predetermined range, wherein the optical sheet includes a base sheet and a plurality of curved lenses arranged parallel to each other on the base sheet, wherein each curved lens is tilted from a vertical direction of the sub-pixels by a gradient determined based on the base and height of a triangle corresponding to an intersection, where the curved lens is superimposed on the number M of horizontally arranged sub-pixels and the number N of vertically arranged sub-pixels, where M is a natural number and N is a natural number equal to or more than M, wherein the gradient of the curved lens is set to a value of $\tan^{-1}$ {(M×a horizontal pitch of the sub pixels)/(N×a vertical pitch of the sub pixels)}, wherein the plurality of curved lenses is tilted from a vertical direction of the base sheet by a gradient of 18.44 to 71.56 degrees, and wherein the neighboring three-dimensional images are overlapped with each other by 15% to 60% at the viewing angle except for a front viewing angle, wherein each of the sub-pixels has a square form having the same horizontal and vertical pitches as each other, and also, each unit pixel consists of red, green, blue, and white sub-pixels arranged in a Quad type, and has a square shape, wherein each of the sub-pixels are given by any one of image numbers from No. 1 to No. 15, and each of the sub-pixels to which the image numbers from No. 1 to No. 15 are given, are arranged in a matrix configuration of 3×5, wherein the width of each curved lens corresponds to the horizontally neighboring three sub-pixels.

2. The three-dimensional image display device according to claim 1, wherein the neighboring three-dimensional images are overlapped with each other by the predetermined range at a lateral viewing angle except for a front viewing angle.

3. The three-dimensional image display device according to claim 1, wherein the display unit includes a cathode-ray tube or flat-panel display.

4. The three-dimensional image display device according to claim 1, wherein the numbers M and N are set according to the number of views provided by the curved lens.

5. A three-dimensional image display device comprising:
a display unit to display two-dimensional images using unit pixels each including at least three colors of sub-pixels;
and an optical sheet to convert the two-dimensional images into a plurality of different three-dimensional images by use of a plurality of curved lenses arranged parallel to one another,
wherein the optical sheet includes a base sheet and a plurality of curved lenses arranged parallel to each other on the base sheet,
wherein the plurality of curved lenses are tilted from a vertical direction of the sub pixels by a gradient of $\mathrm{Tan}^{-1}$ {(M×Hp)/(N×Vp)} where, M is a natural number and represents the number of horizontally arranged sub pixels, Hp represents a horizontal pitch of the sub pixels, N is a natural number equal to or more than M and represents the number of vertically arranged sub pixels, and Vp represents a vertical pitch of the sub pixels,
wherein the numbers M and N are set according to the number of views provided by the curved lens,
wherein the plurality of curved lenses is tilted from a vertical direction of the base sheet by a gradient of 18.44 to 71.56 degrees, and
wherein the neighboring three-dimensional images are overlapped with each other by 15% to 60% at the viewing angle except for a front viewing angle,
wherein each of the sub-pixels has a square form having the same horizontal and vertical pitches as each other, and also, each unit pixel consists of red, green, blue, and white sub-pixels arranged in a Quad type, and has a square shape,
wherein each of the sub-pixels are given by any one of image numbers from No. 1 to No. 15, and each of the sub-pixels to which the image numbers from No. 1 to No. 15 are given, are arranged in a matrix configuration of 3×5, wherein the width of each curved lens corresponds to the horizontally neighboring three sub-pixels.

6. The three-dimensional image display device according to claim 5, wherein the display unit includes a cathode-ray tube or flat-panel display.

7. An optical sheet for three-dimensional images, comprising:
a base sheet; and
a lens array including a plurality of curved lenses arranged parallel to one another on the base sheet,
wherein optical density bands emitted from the neighboring curved lenses are overlapped with each other by a predetermined range,
wherein each curved lens is tilted from a vertical direction of the sub-pixels by a gradient determined based on the base and height of a triangle corresponding to an intersection where the curved lens is superimposed on the number M of horizontally arranged sub-pixels and the number n of vertically arranged sub-pixels where M is a natural number and where n is a natural number equal to or more than M,
wherein the gradient of the curved lens is set to a value of $\tan^{-1}$ {(M×a horizontal pitch of the sub pixels)/(N×a vertical pitch of the sub pixels)},
wherein the plurality of curved lenses is tilted from a vertical direction of the base sheet by a gradient of 18.44 to 71.56 degrees, and
wherein the neighboring three-dimensional images are overlapped with each other by 15% to 60% at the viewing angle except for a front viewing angle,
wherein each of the sub-pixels has a square form having the same horizontal and vertical pitches as each other, and also, each unit pixel consists of red, green, blue, and white sub-pixels arranged in a Quad type, and has a square shape,
wherein each of the sub-pixels are given by any one of image numbers from No. 1 to No. 15, and each of the sub-pixels to which the image numbers from No. 1 to No. 15 are given, are arranged in a matrix configuration of 3×5, wherein the width of each curved lens corresponds to the horizontally neighboring three sub-pixels.

8. The optical sheet according to claim 7, wherein the optical density bands emitted from the neighboring curved lenses are overlapped with each other by the predetermined range at a lateral viewing angle except for a front viewing angle.

9. The optical sheet according to claim 8, wherein each of the plurality of curved lenses has a stripe form having a semispherical cross section.

* * * * *